Figure 1:
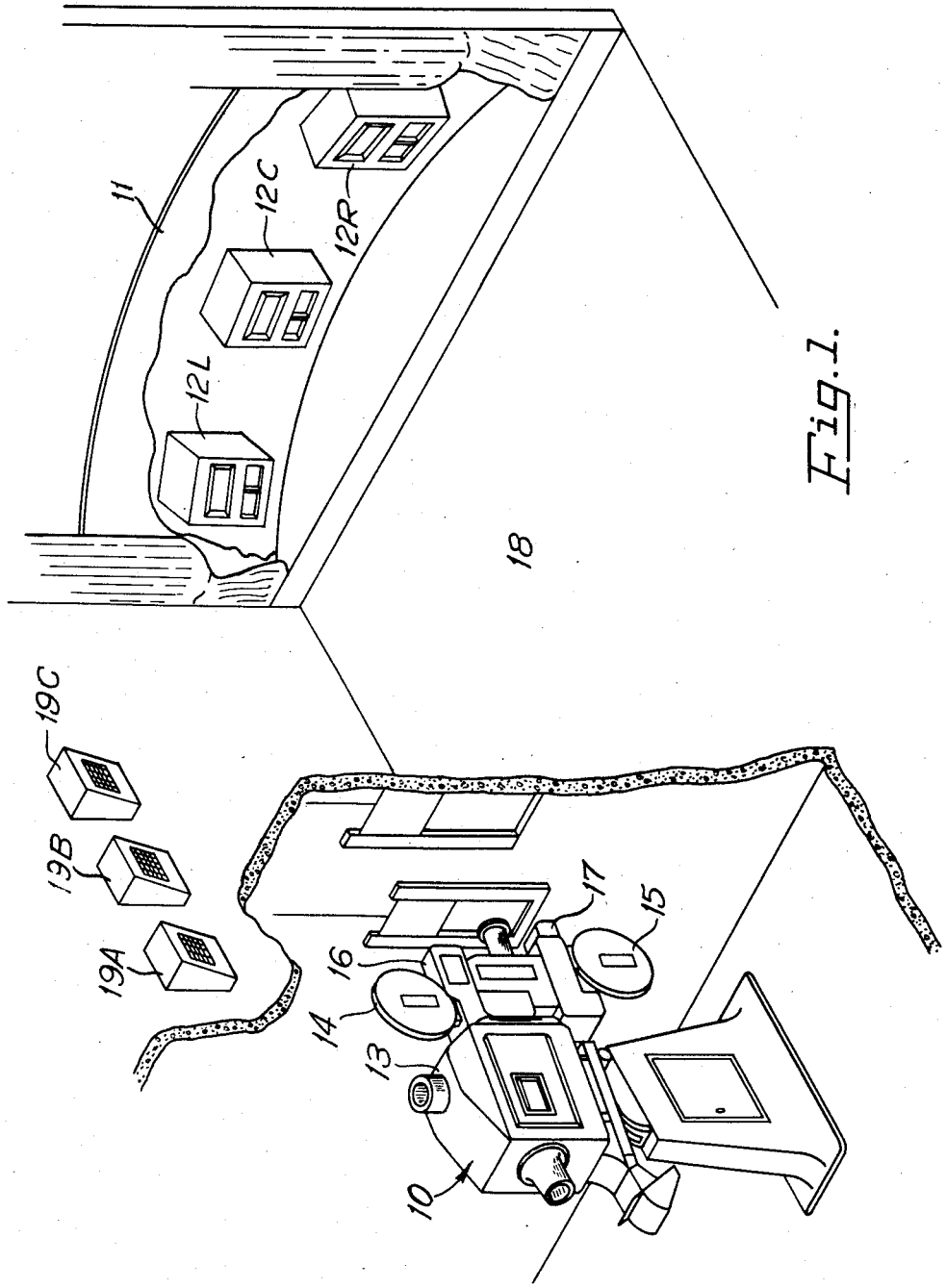

Feb. 9, 1960 D. ABRAMS 2,924,660
COMPATIBLE PICTURE PROJECTION AND SOUND REPRODUCTION
SYSTEM AND APPARATUS THEREFOR
Filed Jan. 19, 1955 4 Sheets-Sheet 2

INVENTOR.
DANIEL ABRAMS
BY James B Boyer
ATTORNEY

INVENTOR.
DANIEL ABRAMS
BY
James W Boyer
ATTORNEY

INVENTOR.
DANIEL ABRAMS
BY James H. Boyer
ATTORNEY

United States Patent Office 2,924,660
Patented Feb. 9, 1960

2,924,660

COMPATIBLE PICTURE PROJECTION AND SOUND REPRODUCTION SYSTEM AND APPARATUS THEREFOR

Daniel Abrams, Belleville, N.J., assignor to Simplex Equipment Corporation, a corporation of Delaware Application January 19, 1955, Serial No. 482,834

1 Claim. (Cl. 179—1)

The present invention relates to motion picture and theater television projection and accompanying sound reproducing systems and apparatus therefor capable of reproducing an effective illusion of integrated sound and pictures from a wide variety of recordings, and more particularly to such systems and apparatus for use in theaters employing wide screen projection techniques to reproduce an appropriate illusion of perspective sound from various types of motion picture film.

The simplest and most commonly used previous form of sound reproduction system to accompany a motion picture presentation included the use of a single loudspeaker located substantially centrally behind the screen. In these systems the size of the screen usually had a width to height ratio of approximately four to three. The single speaker, centrally located behind the screen, gave a fairly good illusion that the sound from the speaker was actually produced in conjunction with the action depicted on the screen. Due to the particular ratio of width to height the screen, the sound was found to be adequate by the average theater patron in conjunction with the picture portrayed or projected. The illusion of integrated auditory and visual action was also maintained when the action on the screen moved to the edge thereof because the eye did not have to wander far from the center of the screen where the sound actually emanated. A satisfactory coordination of auditory and visual presentation was achieved. This was so particularly in theaters which are considerably longer than wide, and particularly from locations farther back in such auditoriums.

Advances in projection techniques made it possible to project the visual representation of the scene over a much greater area. A width to height ratio of the screen in the order of two and one-half to one was made possible, and the size of the screen permitted the projection thereon of not only the central and focal part of the scene but also of background and surrounding side areas which are normally encompassed within the lateral angle of vision of the average theater patron. It was discovered, however, that with such a wide screen a single loudspeaker placed centrally thereof could not present to full advantage the integrated illusion of the sound in conjunction with the projected picture in the qualitatively improved manner accomplished by the improved picture projection itself. It was found to be highly desirable to spread the source of sound substantially over the width of the screen, or preferably have the sound effects accompanying the projected scene move with the motion of the screen. In actual, live theater performances the patron sees moving actors and he hears them as they move; their words move with them. This coordinated motion of sound and of sight can be reproduced satisfactorily by means of stereophonic sound accompanying wide screen projection techniques. It has been found that three sound channels, one for the left portion, one for the center portion, and one for the right portion of the screen, are sufficient. Additional loudspeakers are distributed in the rear or overhead, generally in the rear of the auditorium in order to provide for special effect sounds, such as thunder, coming from generally undefined directions with respect to the scene projected on the screen to increase the realism and the auditory perspective. By means of three spaced loudspeakers and their associated sound channels and a fourth channel for distributed special effects, a very satisfactory imitation or illusion of actual live performances can be achieved, and the installation of such systems is fully justified as indicated by the results obtained.

Installation of stereophonic sound systems requires at least two, and preferably up to four, separate sound channels and their associated equipment. While in ordinary single speaker installations, failure of any components in single sound channel will cause all of the sound to fail, only a portion of the sound originally recorded will be lost upon failure of any component in any channel of a stereophonic reproduction system. Since the remaining sound channels are not affected by the failure of one of them, the audience will still hear most of the sound, although not all of it and not necessarily from the direction in which it was originally recorded.

The motion picture exhibitor has little selection or control over the type of film produced and furnished for exhibition. In order to obtain the widest possible distribution of film to exhibitors, only some of whom may have stereophonic equipment, films are produced for projection either on wide screens or standard screens, and with stereophonic sound, or with but a single sound channel. Those exhibitors who have only a single sound channel available but wish to project such a film on a wide screen are faced with the problem that the illusion of integrated sight and sound is not fully achieved. An exhibitor who has multi-channel stereophonic sound equipment available, has to permit some of the channels to remain idle when showing a film furnished with but a single sound channel recording thereon. In order to broaden the sound so as to make it appear to come from the whole area of the wide screen it would be desirable to use more than one stage speaker located behind, and spaced across the screen, as with true stereophonic reproduction. It had previously been suggested to connect three such speakers in parallel in order to coordinate the illusion of sight and sound. It is entirely feasible to connect spatially distributed loudspeakers in parallel if high level sound distribution patterns from each speaker do not substantially overlap. However, with powerful stage loudspeakers, audience reaction to mere parallel operation was not favorable as interference patterns developed from the synchronous reproduction of the same program by various speakers, causing sound cancellations, or points of duplication in the auditorium. These points of cancellation or duplication shifted with charges in frequency and loudness of the sound, resulting in unnatural reproduction which was particularly noticeable in dialogue. Such systems were tried and later discarded.

In order to overcome the difficulties in merely paralleling loudspeakers and to provide a perspective to sound, it had been proposed to make the sound pertaining to the projected scene follow the major action on the screen. One method of causing the sound to follow sequentially over a group of loudspeakers utilizes a control signal composed of various frequencies to control the gain of amplifiers associated with different loudspeakers so that the sound appears to come from the loudspeaker having the maximum volume as determined by its amplifier under influence of the control signal. The complexity of control signal is primarily a function of the number of loudspeakers used. Where only a small number of loudspeakers are deemed necessary, the control signal and the sound signal may be superimposed on one track under such condition that the sound signal and control signal components can again be separated and selected by means of suitable filters. This involves the use of auxiliary equipment and selecting networks which would be additional to the installation of the multiple loudspeakers and their associated amplifying equipment.

It is accordingly an object of the present invention to provide a sound picture projection and reproduction system which will create an integrated illusion of sight and sound and permit the multiple operation of loudspeakers without the undesirable effect of spurious interferences at certain shifting locations within the auditorium.

It is a further important object of the present invention to provide a picture projection and sound reproduction system which will create coordinated visual and auditory effects and still permit the use of stereophonic sound reproduction equipment with single track sound recordings.

It is another object of the present invention to provide a picture projection and sound reproduction system capable of maintaining substantially the illusion of motion of sound with the motion of the action projected on a wide screen, without selective control networks and without annoying interferences in the auditorium.

It is an additional object of the present invention to provide a sound reproducing system having loudspeaker actuating, matching, and switching networks which will be free of vacuum tubes, reliable in operation and substantially free of periodic maintenance and checking, and which may be remotely controlled, either directly or by means of interlocking circuitry.

It is yet another object of the present invention to provide a sound reproduction system in conjunction with optical picture projection, which may be actuated by signal translation devices responsive to either optical, magnetic, electric or other impulses and which will be balanced so that the amount of output available at each individual loudspeaker of a group may be adjusted to be equal, or to other predetermined ratios, regardless of inherent differences in sensitivity or frequency response of each signal translating device.

It is still another object of the present invention to provide a sound reproduction system which will be capable of reproducing sound from more than two channels either in its intended stereophonic manner or under emergency condition in different manner while still maintaining the integrated illusion of sight and sound and provide for intermixing of channels while preventing cross modulation between channels.

It is yet another object to provide a picture projection and sound reproduction system which will create for the audience an effective integrated illusion of perspective sight and sound when the actual source of sound is essentially stationary which illusion will be substantially equivalent to the impression on the audience when the sound is caused to move under influence of control signals.

While the above discussions primarily refer to sound motion picture projection, they are equally applicable to theater television or other picture representation systems accompanied by sound and having controlled sound reproduction means, such as electronic amplifiers and loudspeakers.

With the above objects in view the invention essentially relates to a theater sound picture projection system producing a coordinated spatial illusion of sight and sound. The system of the invention is compatible in the sense that it may be used with a variety of types of picture and sound transmissions or recordings, e.g., with sound film having either magnetic or optical sound tracks, mechanical recordings, or other picture and sound signals arranged for simultaneous presentation; the signals may be transmitted over wire or by radio such as theater television and the like. The sound portion may be either stereophonic multichannel sound recordings, single channel sound film, recordings having sound tracks wherein the intensity or the reproduction characteristics may be controlled or not by means of separate or superimposed control signals or any other audio channel. A means is provided to display or project pictures on a screen, such as, for example, motion picture projectors or theater television systems of various kinds. In conjunction, and simultaneously with the display of the picture sound is reproduced by means of loudspeakers or like apparatus located customarily on a stage behind the screen. The invention is particularly adapted to theater installations wherein three loudspeakers are located behind the screen, one at the left portion, one at the center, and one at the right portion of the stage of the theater auditorium.

In accordance with a feature of the present invention the "left" and "right" speakers are excited at a lower level than the central speaker. The decrease in level need not be very great, three decibels being sufficient, but it may be more. By virtue of this decrease in level, undesirable sound interference patterns and the like are substantially eliminated within the theater and it is therefore possible to excite all three speakers with the same signal to provide for full, evenly distributed sound from all parts of the stage and proper coordination of the sound with the displayed picture. While the reproduction in such a case is not true stereophonic because the sound from all three speakers is in phase, the illusion that the sound moves with the action displayed on the screen is sustained because sound comes from all portions of the screen and therefore some sound will emanate from the portion of the screen where the action may move and the viewer will readily have the illusion that the sound does come from the depicted scene.

In accordance with another feature of the invention true stereophonic sound, i.e., a plurality of sound signals corresponding to "left," "center," and "right" reproducing positions are combined for presentation through either the "center" or both the "left" and "right" reproducing channels. This is accomplished by means of networks wherein the signals are mixed in appropriate intensities. Although the reproduction of such a mixed signal by a signal central loudspeaker or a group of loudspeakers operated in phase will not be stereophonic, none of the sound components of the original signal are lost. Should the signal supplied to this loudspeaker be such that a major portion of the sound is carried by only one of the three original channels, e.g., the "left" channel, due to loud action occurring on the left side portion of the screen while complete silence remains on the center and other side portion, sound will still be available to accompany the picture because the sound from the "left" channel will be reproduced. The spatial illusion will still be obtained due to the decrease in intensity of the sound corresponding to the increased distance of the action from the central portion of the screen.

The invention further relates to circuits and networks accomplishing equalization of sound reproduction from a variety of sound translation apparatus, such as magnetic pickups, optical sound heads, mechanical recordings, microphones, radio channels, etc., so that the frequency and intensity characteristics of the signal supplied to the loudspeakers will be identical regardless of which signal translation device is switched in the circuit. A further feature relates to muting the reproducing device, such as a loudspeaker, just before switchover to prevent any objectionable switching clicks.

Further features of the invention relate to the circuitry to simultaneously mix the signals, control their respective intensities to the desired levels and provide for correct impedance matching of loudspeakers or other transducers or signal translation means and the circuits connected thereto.

The invention may best be understood from a consideration of the following detailed description, wherein the invention has been disclosed as embodied in a three channel film sound recording and film sound reproducing system, having a "left," "center," and "right" loudspeaker systems. It is to be understood that the invention is not limited to three channels or to the specific system, as any type of recording and reproducing system may be used, and the recorders or reproducers may be replaced by different amplification or transmission channels.

Figure 2:
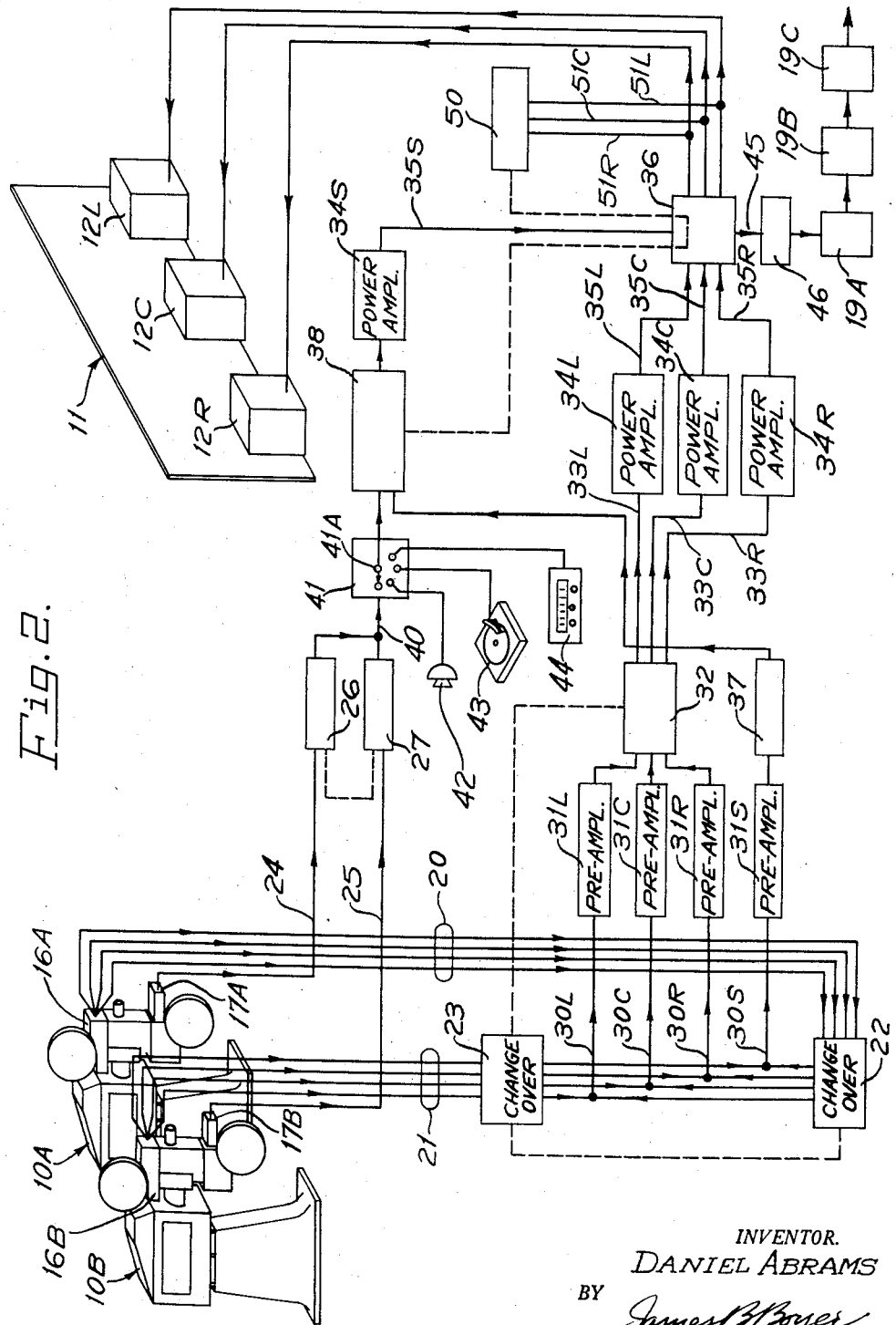
Figure 3:
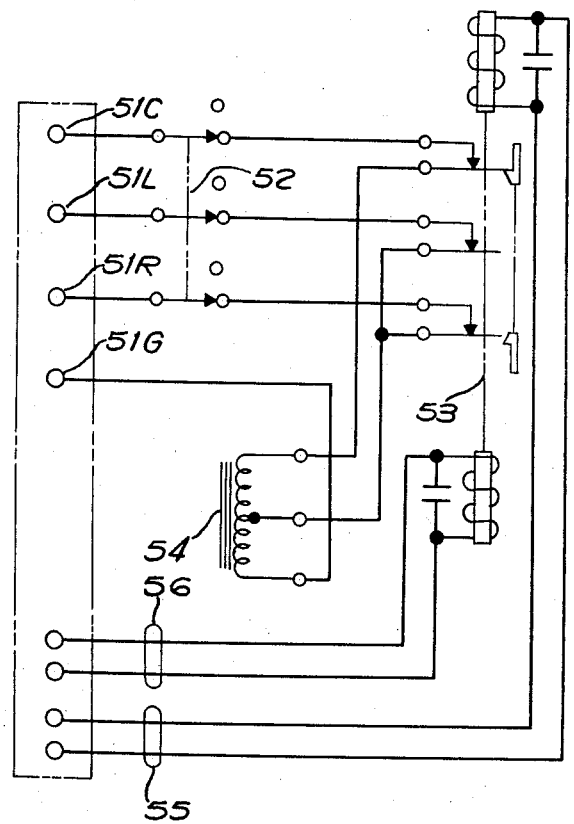
Figure 4:
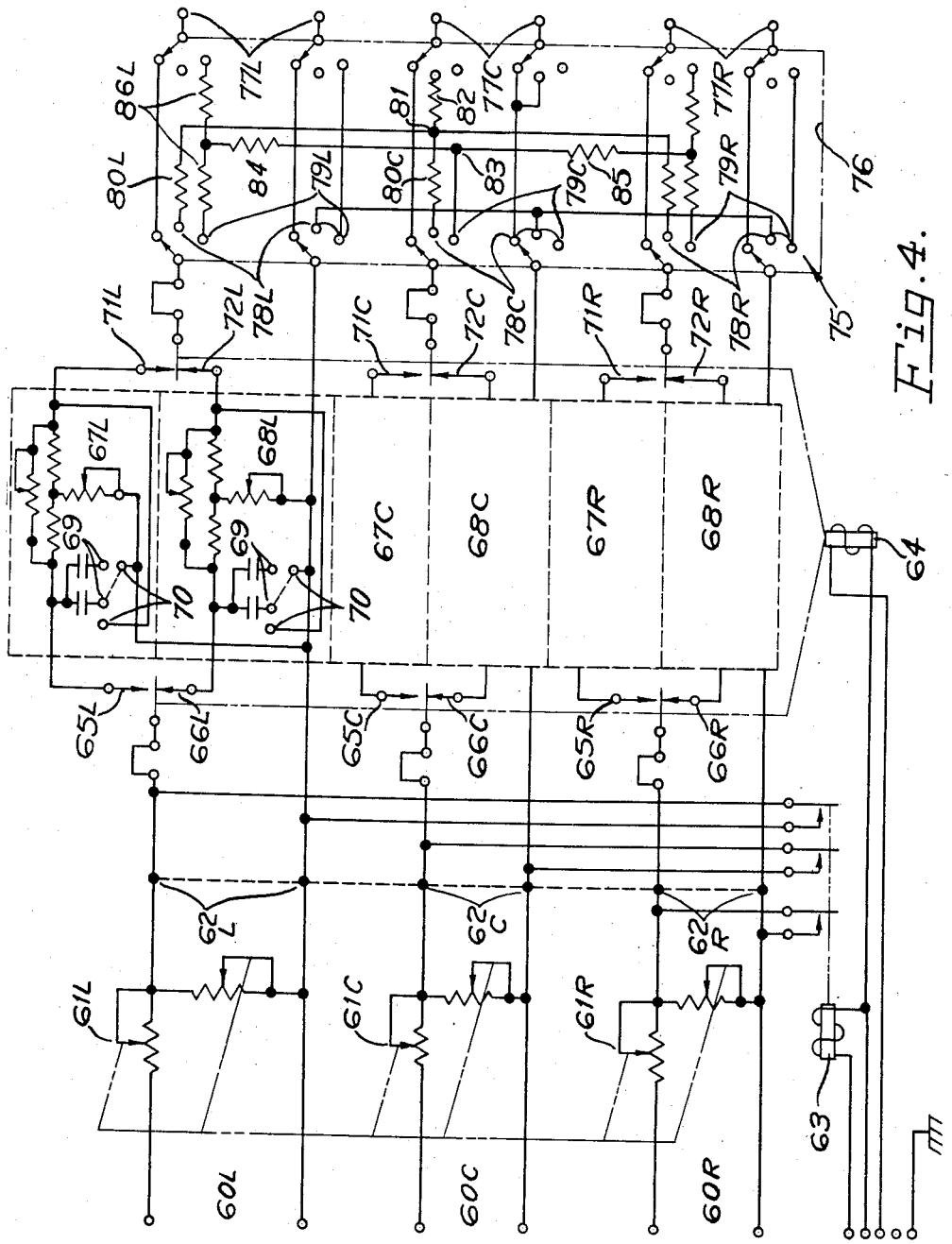

In the accompanying drawings, Fig. 1 is a perspective diagrammatic representation of the compatible picture projection and sound reproducing system according to the invention; Fig. 2 is a schematic layout of said system; Fig. 3 is a schematic diagram of the mixing, impedance matching, and attenuating network; and Fig. 4 is a detailed circuit diagram of the equalization, switchover, and muting network.

Referring now to the drawings and in particular to Fig. 1, a motion picture projector 10 projects pictures from a film on a screen 11. Simultaneously with display of the picture on the screen, sound is reproduced from three spatially distributed substantially similar stage loudspeakers, 12L, 12C, and 12R. The screen 11 is located in front of the stage speakers 12L, 12C, and 12R and is shown to be of the modern wide screen type, i.e., having a width to height ratio of approximately two and one-half to one. The projector is provided with the usual light source 13, film reels 14 and 15; sound signal translating means are represented by magnetic soundhead 16 and optical soundhead 17.

During display of the picture on screen 11, sound is reproduced from either one, two, or all of the loudspeakers 12L, 12C, and 12R, and due to the distributed location thereof, a viewer placed in the auditorium, generally indicated at 18, will have a coordinated illusion of sight and sound, in that the sound will appear to come from the particular scene displayed. Special and generally distributed sound effects like thunder, background noise, etc., which may not bear a direct relation to the scene displayed on the screen 11 are most advantageously reproduced from locations in the rear of the theater and special effects speakers are here shown at 19a, 19b, 19c, etc.

Reference will now be had to Fig. 2 wherein the compatible sound and picture reproduction system is shown in more detail. Two projectors are employed, denoted by 10a and 10b, for continuity of visual presentation of pictures, and as well known in the art. Each projector has its own individual magnetic soundhead 16a, and 16b and its own optical soundhead 17a and 17b. The magnetic soundheads 16a and 16b are provided with four individual sound pickups for reproduction of four-channel stereophonic sound, one for each of the reproducing channels, "left" (L), "center" (C), and "right" (R), and the fourth channel for special effects (S). Output cables 20 and 21 from the magnetic pickups 16a, 16b of each projector, 10a and 10b, are connected to a pair of changeover units 22, 23. For convenience in using existing systems the outputs of the optical pickups are connected through lines 24 and 25 to individual optical changeover units 26 and 27, although the changeover units 22 and 23 may be constructed to effect switching of the optical output as well as of the magnetic output.

Changeover units 22 and 23 essentially consist of manually operated, multiple, locking relays connecting either of the cables 20 or 21 to lines 30L, 30C, 30R, and 30S, which feed into preamplifiers 31L, 31C, 31R, and 31S. Each of these preamplifiers form a separate circuit channel for a discrete signal. The output of the preamplifiers 31L, 31C, and 31R is fed to an equalization and mixing network unit 32, hereinafter more fully described. This unit 32 essentially consists of a bank of similar frequency modifying and attenuating networks which may be selectively switched in and out of circuit so that the output appearing at lines 33L, 33C, and 33R has the same characteristics for a given input signal supplied to the soundhead 16a and 16b regardless of individual differences in response and sensitivity of the pickup heads 16a and 16b. The dash line indicates that unit 32 and changeover units 22 and 23 are operated by a common control so that the particular network in unit 32 is switched in the circuit for the appropriate projector sound pickup. The signal is then further amplified in discrete network channels, shown as power amplifiers 34L, 34C, and 34R and connected by means of conductors 35L, 35C, and 35R to a switching unit 36, and then to the loudspeakers 12L, 12C, and 12R as will appear more fully below.

Preamplifier 31S which amplifies special effects signals is preferably connected to a special effect switcher shown at 37, although the switcher 37 may be omitted. It is utilized to mute the special effects channel when no sound signal appears thereon to prevent noise and static. Switcher 37 is operated by means of a control signal superimposed on the special effects track and since it does not form part of the present invention, it is therefore not further described here. The output of switching unit 37, which consists of the special effect sound signals, is connected to a system selector unit 38, which unit is connected by a common control to switching unit 36 as shown by the dashed line. This system selector unit essentially consists of a switch connecting the output of either the special effects magnetic soundhead or the optical soundhead to power amplifier 34S, the output of which is connected by means of conductor 35S to the switching unit 36. Auditorium speakers 19a, 19b, 19c, etc., are supplied from the switching unit 36 through line 45 and a matching transformer 46 from line 35S when the system selector unit is set to select stereophonic sound operation of the system.

The changeover units 26 and 27 connect either of the optical pickups 17a or 17b in circuit with line 40, which supplies an equalization network unit 41. The construction of equalization network unit 41 may be similar to unit 32 and indeed unit 32 may consist of additional banks of networks if the optical sound system is connected to the changeover units 22 to 23 as previously noted. Preamplifiers for the optical soundheads 17a and 17b may also be included, when necessary. Additional signal translation channels, and associated preamplifier and equalization networks equipment may also be supplied and connected in circuit by means of manual switch 41a. Such signal translation means may be, for example, microphone 42, recordplayer 43, or a radio tuner 44. The output of unit 41 is connected to the system selector unit 38, as has previously been noted, which will connect either this output or that of special effects switcher 37 to power amplifier 34S.

A mixing, attenuating and matching network 50 is connected by means of lines 51L, 51C, and 51R to the line supplying the speakers 12L, 12C, 12R, and is controlled from the system selector unit 38 through switching unit 36, as will appear more fully below.

Before considering the particular networks of equalization and switching unit 32 and mixing, attenuating and matching network in detail, the operation of the system for various kinds of film will be described. If multichannel stereophonic sound film is provided to the exhibitor, the film will be projected by a selected one of the projectors, and sound will be separately supplied through the channels L, C, and R to speakers 12L, 12C, and 12R through the units having like subscripts. Mixing unit 50 will be disconnected. The fourth, or special effects signal is separately amplified in preamplifier 31S, switched on or off in switcher unit 37, connected through selector unit 38 to power amplifier 34S and supplied to the auditorium speakers through switching unit 36. The sound reproduction accompanying the picture on screen 11 will be true stereophonic in that there may be a difference in intensity and phase as well as in the character and context of the signal in each sound channel which will be truly reproduced by each loudspeaker and the result to the listener in auditorium 18 will be a true stereophonic rendition of the original presentation accompanying the picture on the screen to afford an integrated illusion of sight and sound. As the action displayed on the screen moves, for example, from the left portion thereof to the right the sound will move with it; and further, if an orchestral production is displayed on the screen the sound from the string sections will come predominantly from the left speaker and the instruments of different tone quality, such as brass, from the right as is customary in orchestral arrangements.

The exhibitor, however, is also enabled to display pictures from film having but a single sound track, which may be either optical or magnetic; or he may wish to make announcements over a microphone. In case of optical sound, the system selector unit 38, with it switching unit 36, will be set so as to disconnect lines 35L, 35C, and 35R from the loudspeakers and to connect lines 24 and 25 through the respective changeover unit 26 or 27, equalization network 41, selector unit 38, power amplifier 34S and line 35S to the center loudspeaker only.

If only a single magnetic channel is available, i.e., if the film furnished to the exhibitor has only one magnetic sound track, only one of the channels "left," "center," and "right" will be active, and reproduction will normally be over the center loudspeaker 12C. In case of failure of a side channel when exhibiting multi-channel stereophonic film, reproduction of the unaffected remaining sound will likewise be over the center speaker 12C. Referring to Fig. 1, it may readily be seen that sound emanating from the center of the screen having the appreciable width to height ratio of two and one-half to one may sound somewhat unnatural if the center of action of the scene displayed on the screen is primarily on either side and not in the center. In order to distribute the sound throughout the auditorium 18 from each of the three loudspeakers, and to provide a full and superior distribution of sound, the network unit 50 is switched in the circuit. This unit 50 will not merely effect a parallel connection of loudspeakers 12L, 12C, 12R; mere parallel connections cause the three loudspeakers to operate with equal intensity and in phase, and such operation gives rise to objectionable distortions and sound interferences in auditorium 18 which are particularly noticeable when dialogue is reproduced. In accordance with the present invention, unit 50 while connecting the speakers 12R and 12L in parallel with speaker 12C will provide for reproduction of the sound from the two side units at a reduced level as well as for correct impedance match of three speakers in parallel on a supply line impedance designed for only one speaker, so that sound interference patterns within the auditorium 18 are substantially eliminated and a substantial illusion of coordinated sight and sound is secured.

Reference will now be had to Fig. 3 wherein the circuit diagram of unit 50 is shown in detail. In contrast to the schematic diagram of Fig. 2, which is a one line diagram, Fig. 3 shows the ground return line 51G which is common to the whole system. A switch 52 is provided to disconnect the unit 50 manually from speakers 12R, 12C, and 12L. With single track sound the unit 50 will be connected in the circuit whenever it is desired to project pictures on the total width of screen 11, in other words, pictures having a width to height ratio substantially greater than four to three so that it becomes important to have more than a central sound source in order to maintain a coordinated presentation of sight and sound. A two position three pole locking type relay 53 has one contact each connected to each of the lines 51L, 51C, and 51R. A matching autotransformer 54 has one outside terminal connected to the common ground through line 51G, so that when the relay is in the position shown it will be connected across the line supplying the central loudspeaker. This transformer 54 has a mid tap, and this tap is connected to the other contacts of the relay corresponding to lines 51L and 51R in parallel, so that when the relay is in the position shown in Fig. 3, lines 51L and 51R are supplied at a lower voltage level through the transformer due to the stepdown characteristics thereof, and at the same time at correctly matched impedance for two loudspeakers in parallel. The coils of relay 53 are energized through lines 55 and 56, which are connected to control unit 36 to be operated from system selector unit 38. When line 55 is energized, the relay will be in the position shown in Fig. 3; upon energization of line 56 the relay will operate to the other position thereby opening the circuit connection from line 51C to autotransformer 54 and of lines 51L and 51R to the mid tap so that normal stereophonic multichannel sound may be reproduced through each one of the three channels by each one of loudspeakers 12L, 12C, and 12R.

In a preferred form, loudspeakers 12L, 12C, 12R each have an input impedance of 16 ohms. Autotransformer 54 is selected to match the 16 ohm impedance of the speakers and the mid tap of the transformer for matching two 16 ohm speakers in parallel.

Supply of three spatially distributed loudspeakers in parallel by and in itself does not form part of this invention; yet I have found that supply of a number of loudspeakers in parallel at high sound levels and having substantially overlapping fields of sound distribution is provided without objectionable sound interference patterns if the outside loudspeakers, 12L and 12R, reproduce at a lower level than the center loudspeaker 12C. The stepdown transformer 54 will apply a voltage of about 70 percent of terminal voltage to the outside loudspeakers 12L and 12R, which corresponds to a drop in loudness of about three decibels. Of course, a greater number of loudspeakers may be operated in parallel with due regard to proper impedance matching of the output lines of power amplifier to the number of loudspeakers employed; the total sound energy will not change and be determined by the system volume control. Use of a single autotransformer having a tap at half impedance level simultaneously accomplishes the proper impedance match and the drop in level. A projection system is therefore provided in which an integrated illusion of sight and sound is obtained when stereophonic multi-channel sound is supplied thereto as well as when only single monoaural sound is available.

The attenuating and matching network in unit 50 is designed to supply a plurality of reproducing devices from a single sound channel. The invention, however, also provides for the supply of one or two reproducing means from three or more sound channels. This feature of the invention becomes important when stereophonic sound film is available, and any element in the channel fails, so that single channel reproduction becomes necessary under emergency conditions. The equalization and switchover network unit 32 (see Fig. 2) includes a circuit to accomplish mixing of signals supplied from preamplifiers 31L, 31C, and 31R so that output is available over either lines 33L and 33R for two channel reproduction. The signals from the three preamplifiers 31L, 31C, and 31R may also be mixed so that the output will appear over line 33C alone for single channel reproduction. Of course, the thus mixed sound to be amplified and reproduced over a single channel may well be spread over the three loudspeakers, 12L, 12C, and 12R by switching in the matching and attenuating network unit 50 so that an integrated illusion of sight and sound is achieved under emergency conditions as well as when reproducing sound stereophonically under its intended ideal conditions. While the stereophonic character of the sound is not obtained when network unit 50 is switched in, the lateral spread of the source of sound by utilizing all three speakers will provide sound emanating from any portion of the screen regardless of where the principal action portrayed is concentrated and the imagination of the viewer will make it appear that the sound actually does come from varying centers of sound action for the scene displayed.

The circuit of equalization network unit 32 is shown in detail in Fig. 4. The output of preamplifier units 31L, 31C, and 31R is applied to terminals 60L, 60C, and 60R. Three like attenuating networks 61L, 61C, and 61R of conventional design function as volume control for each of the three channels. As shown, the potentiometer is ganged together so that equal attenuation is obtained on all three channels. The output of attenuating networks 61L, 61C, and 61R is connected to terminals 61L, 62C, and 62R. Muting relay 63 is connected across terminals 62L, 62C, 62R to short circuit the same. As will appear more fully below, this relay operates a fraction before the operation of the switchover relays so as to short out any input to the power amplifiers and to avoid objectionable switching clicks when connections to the preamplifiers are opened.

One each of the terminals 62L, 62C, and 62R, is connected to channel ground; each other terminal is connected to a corresponding movable arm of a six pole double throw relay 64, having fixed terminals 65L and 66L, 65C and 66C, 65R and 66R. Fixed contact 65L is connected to a frequency warping and attenuating network 67, consisting of fixed and variable resistors as shown, and fixed condensers as shown, as is well known in the art. The condensers may be connected as shown by a dotted line, or different connections may be made from or to any of the terminals 69 and 70. A similar frequency warping and attenuating network 68 is connected to the other terminal 66L of the relay. The output of network 67 is connected to fixed terminal 71L of relay 64 and the output of network 68 is connected to terminal 72L. Similar networks 67C and 68C, 67R and 68R, are connected to terminals 65C and 71C, 65R and 71R, 66C and 72C, and 66R and 72R respectively. Each of these networks is individually adjustable.

When it is desired to use projector 10a, for example, so that the output of the magnetic sound appears on cables 20, changeover unit 22 will be actuated to connect cable 20 to lines 30L, 30C, 30R, and 30S. Simultaneously relay 64 will be actuated to the position shown in Fig. 4, so as to make contact with terminals 65L and 71L, 65C and 71C, 65R and 71R. Each individual network is then adjusted by means of a test film passed through the projector to give the identical output, both in frequency response and amplitude, thereby compensating for any manufacturing differences in the individual sound pickup for the various tracks in soundhead 16a. Changeover unit 22, 23 is then operated. Upon operation thereof, power will first be supplied to muting relay 63 which will operate, short circuiting the input to the attenuating and warping networks, before disconnecting the soundhead 16a from the input to the preamplifiers 31L, 31C, 31R, to prevent switching clicks. Then relay 64 will operate changing the connection to contacts 66L and 72L, 66C and 72C, and 66R and 72R, thereby placing networks 68R, 68C, and 68L in the circuit (as shown in Fig. 4) and muting relay 63 will be opened upon completion of the changeover. The resistances and capacitances of network 68L, 68C, and 68R will then be adjusted by means of an identical test film passed through projector 10b, so that again the output of all three channels will have the same frequency and level characteristics, as well as the same characteristics of that obtained from projector 10a.

As noted above, the six pole double throw relay 64 may be replaced by another multiple relay if more channels or more projectors are used; and changeover units 26, 27 for use on optical sound may include similar networks to compensate for inherent differences in response of the optical sound pickup 17a and 17b. If desired, these changeover units and networks may be incorporated in unit 32.

No equalization is usually necessary for the special effects channel, the output of which appears at preamplifier 31S. These special effects are usually only of a general nature and do not include dialogue or music where utmost fidelity of reproduction is important. Of course, equalization may also be effected for this channel by the mere addition of contact banks to relay 64 and of networks similar to network 67.

In case of failure of any element in power amplifier 34L, 34C, and 34R it is still possible to obtain distributed sound for all three channels by means of mixing and matching network 75 shown in Fig. 4. A twelve pole three position manually operated switch 76 is provided to connect the components of network 75 into the circuit.

In its normal position shown in the drawing, the output of the attenuating networks is connected straight through to the output terminals 77L, 77C, and 77R of unit 32, to be further connected through lines 33L, 33C, and 33R to the power amplifiers 34L, 34C, and 34R. In case of failure of either of the outside channels, however, it is advantageous to mix the sound of these outside channels L and R together with the sound of the center channel for reproduction through the center loudspeaker, or through the three loudspeakers L, C, and R by means of unit 50 as has previously been explained. It has been found that merely disconnecting the two outside channels and relying on the existing channels gives an unnatural reproduction, lessening the illusion of sight and sound. On the other hand, mere parallel connection of three separate stereophonic channels is not feasible due to the resulting severe impedance mismatch. The network 75 eliminates these difficulties and, according to the present invention, the integrated illusion of sight and sound is maintained.

Upon failure of any outside channel switch 76 is switched to its central position, termed "emergency-center." It is to be noted that in this position the output terminals 77L and 77R of the switch are disconnected, the center terminal 77C only supplying energy to line 33C. Input terminals 78L and 78R however are connected. Terminals 78L and 78R are connected to resistors 80L and 80R, the other terminals of these resistors being connected in parallel at junction 81, which junction is connected by means of a further resistor 82 to output contact 77C by means of the center contact of switch 76. The other, common ground connection is connected straight through as shown.

Should a failure occur in the center channel, then stereophonic, two channel sound may be obtained by using the two outside channels L and R alone, mixing in the signal appearing across contact 79C of switch 76. In the lower position of the switch (referring to Fig. 4) it is seen that the center output contacts 77C are disconnected. Contact 71C of relay 64 is connected through switch 76 to a junction 83. From this junction, two resistors 84 and 85 are connected to the midpoint of a pair of matching resistors 86L and 86R of each of the side channels. Resistors 84 and 85 have approximately the same resistance as the total of each of resistors 86L and 86R. It is highly undesirable to have any crosstalk between channels L and R, and therefore it is to be noted that the resistance between channels L and R is twice that of the resistance from the center channel to either side channel, and further includes the resistance of matching resistors L and R. In view of this greatly mismatched and considerable impedance of the cross-connection with respect to the impedance of the matched output line, crosstalk is a minimum. As before the channel ground connection is switched through by the remaining contacts of the switch 76.

All power supplies and connections have been omitted, since they are conventional, and it is understood that relays 53, 63, and 64 are energized from suitable sources, preferably from the filament power supplies of the amplifier equipment.

The loudspeakers 12L, 12C, and 12R may be of unitary construction, or may include low frequency "woofers" and high frequency drivers and the associated crossover networks. The special effects speakers 19a, 19b, 19c, etc. preferably are single speaker units.

It is seen that the theater sound picture projection system of the present invention provides for a coordinated spatial illusion of sight and sound. The sound sources may be multiplied and spaced laterally behind the wide screen to give the effect of a distributed sound source, while maintaining fidelity of reproduction and eliminating sound interference patterns. The illusion of distributed perspective sound is obtained both with single optical sound track, or single magnetic sound track film by switching unit 50 in the circuit. This distributed sound to accompany wide pictures is likewise available under emergency conditions in case of failure of either or both of the "left" and "right" power amplifiers 34L and 34R, by suitable switching of network 75. In case of failure of the "center" power amplifier 34C two channel, stereophonic sound is available by means of appropriate switching of network 75, without loss of the signal recorded on the center channel.

The illusion of integrated sight and sound is enhanced by maintaining constant reproduction characteristics of all channels regardless of differences in response and sensitivity of individual pickup heads; this is accomplished by adjustment of networks 67L, 67C, and 67R and 68L, 68C, and 68R, and networks in unit 41. The muting relay 63 prevents switching clicks by shortcircuiting the supply connections to the networks just before and during switching from one soundhead to another.

While the invention has been illustrated and described as embodied in a sound motion picture projection system, it is not intended to be limited to the details shown, since various modifications and structural changes may be made. By applying current knowledge, the invention may be adapted to various applications; and such adaptations should and are intended to be comprehended within the meaning and range of equivalence of the following claim.

What is claimed is:

In a switching and distribution network unit for selective parallel operation of three substantially alike loudspeaker means from a single sound channel, which loudspeaker means are laterally distributed through an auditorium to provide for left, center and right sound sources having overlapping sound distribution fields and which loudspeaker means each have a pair of terminals, one of each terminal of the pair being connected in common; a relay having three pairs of contacts, one pair each for left, center, and right; means connecting one contact of each pair of relay contacts to the respective remaining terminal of the left, center, and right loudspeaker means; an impedance matching autotransformer having a tap at half impedance level; connection means connecting one terminal of said autotransformer to the common terminal of all said loudspeaker means; a connection from the other terminal of said autotransformer to the other contact of the center pair of the relay; means for connecting said sound channel to the said common terminal and to the said remaining terminal of the said center loudspeaker means for energizing same; a connection from the half impedance tap of the transformer to both the other contacts of the right and left pairs of the relay to provide for correct impedance matching of the left and right loudspeakers in a parallel with the center loudspeaker and simultaneosuly for a decrease in power supplied to the left and right loudspeakers; and means to operate and control said relay for disconnecting or connecting together the relay contacts and to thereby disconnect or connect said autotransformer from or to the circuit from the sound channel to the center loudspeaker means and to disconnect or connect the parallel connections of the left and right loudspeakers to the tap of the autotransformer, to provide for reproduction of sound either from the center loudspeaker means individuallp or from said left and right loudspeaker means in parallel with and at a predetermined, constant decreased intensity from said center loudspeaker to thereby substantially eliminate sound interference patterns within the auditorium.

References Cited in the file of this patent

UNITED STATES PATENTS

| | | |
|---|---|---|
| 1,589,139 | Foley | June 15, 1926 |
| 1,781,550 | Kwartin | Nov. 11, 1930 |
| 1,942,068 | Owens | Jan. 2, 1934 |
| 2,013,021 | Weiss | Sept. 3, 1935 |
| 2,021,181 | Hall | Nov. 19, 1935 |
| 2,101,121 | Wixon | Dec. 7, 1937 |
| 2,298,618 | Garity et al. | Oct. 13, 1942 |
| 2,303,456 | Hardenberg | Dec. 1, 1942 |
| 2,655,564 | Holt-Seeland | Oct. 13, 1953 |
| 2,714,633 | Fine | Aug. 2, 1955 |

FOREIGN PATENTS

| | | |
|---|---|---|
| 309,208 | Great Britain | Apr. 2, 1929 |

OTHER REFERENCES

Technilog-University Loudspeakers, publication, 28 pgs. page 9 relied on.

Radiotron Designer's Handbook, Langford & Smith, 4th edition, pub. by Wireless Press, 1952; pgs. 200–203 relied on.

"Simplex Stereophonic Theatre Sound System," in vol. 28, issue #6 of "International Projectionist" (June 1953), pgs. 16, 17.

"Stereophonic Sound," vol. 24, issue No. 3 of "British Kinematography" March 1954, pgs. 64–71.